(12) United States Patent
Hansen

(10) Patent No.: US 8,177,509 B2
(45) Date of Patent: May 15, 2012

(54) LIGHTNING PROTECTION SYSTEM FOR A WIND TURBINE BLADE

(75) Inventor: Lars Bo Hansen, Agerskov (DK)

(73) Assignee: LM Glasfiber A/S, Lunderskov (DK)

( * ) Notice: Subject to any disclaimer, the term of this patent is extended or adjusted under 35 U.S.C. 154(b) by 1021 days.

(21) Appl. No.: 12/085,691

(22) PCT Filed: Dec. 1, 2006

(86) PCT No.: PCT/DK2006/000679
§ 371 (c)(1),
(2), (4) Date: May 29, 2008

(87) PCT Pub. No.: WO2007/062659
PCT Pub. Date: Jun. 7, 2007

(65) Prior Publication Data
US 2009/0139739 A1    Jun. 4, 2009

(30) Foreign Application Priority Data
Dec. 2, 2005 (DK) .................................. 2005 01707

(51) Int. Cl.
*F04D 29/00* (2006.01)
(52) U.S. Cl. ................................................. 416/146 R
(58) Field of Classification Search .............. 416/146 R, 416/230, 229 A, 1; 361/216, 218, 220
See application file for complete search history.

(56) References Cited

U.S. PATENT DOCUMENTS

| | | | |
|---|---|---|---|
| 5,369,225 A | 11/1994 | Natwig et al. | |
| 5,573,426 A | 11/1996 | Grant | |
| 6,457,943 B1 | 10/2002 | Olsen et al. | |
| 2004/0028528 A1* | 2/2004 | Flemming ................. | 416/146 R |
| 2005/0146832 A1 | 7/2005 | D'Alessandro | |

FOREIGN PATENT DOCUMENTS

| | | |
|---|---|---|
| DE | 102 33 528 A1 | 2/2004 |
| EP | 0 977 336 A2 | 2/2000 |
| WO | 96/07825 A1 | 3/1996 |
| WO | 00/14405 A1 | 3/2000 |
| WO | 03/028182 A1 | 4/2002 |
| WO | 02/48546 A1 | 6/2002 |
| WO | 2004/111686 A1 | 12/2004 |

\* cited by examiner

*Primary Examiner* — Edward Look
*Assistant Examiner* — Dwayne J White
(74) *Attorney, Agent, or Firm* — The Nath Law Group; Jerald L. Meyer; Robert T. Burns

(57) ABSTRACT

The invention relates to a lightning protection system for a wind turbine blade, where the blade is a shell body made of a composite material and comprises a root area and a tip end. The lightning protection system comprises at least one lightning receptor arranged freely accessible in or on the shell unit surface on or in the immediate vicinity of the tip of the blade, and a lightning conductor made of electrically conductive material extending within the shell body along substantially the entire longitudinal direction of the blade. The lightning receptor and the lightning conductor are electrically connected by means of a connection area. The lightning conductor in its entire longitudinal direction as well as the connection area between the lightning conductor and the lightning receptor are electrically insulated in order to prevent lightning striking through the surface of the blade.

12 Claims, 4 Drawing Sheets

LIGHTNING PROTECTION SYSTEM FOR A WIND TURBINE BLADE

TECHNICAL FIELD

The present invention relates to a wind turbine blade with a lightning protection system, wherein the blade is a shell body made of a composite material and comprises a root area and a tip end, and wherein the lightning protection system comprises at least one lightning receptor arranged freely accessible in or on the shell body surface at or in the immediate vicinity of the tip of the blade, and a lightning conductor made of electrically conductive material extending within the shell body along substantially the entire longitudinal direction of the blade, and wherein the lightning receptor and the lightning conductor are electrically connected by means of a connection area.

BACKGROUND ART

It is known to provide blades with lightning protection systems to protect them from lightning strikes. As an example, WO 96/07825 discloses a lightning protection system, in which the tip of the blade is provided with a so-called lightning receptor made of an electrically conductive material. This lightning receptor can "capture" a lightning strike and conduct the current through a lightning conductor, said conductor extending in the longitudinal direction of the blade and being earthed via the rotor hub of the wind turbine. This system has often been shown to provide a satisfactory protection against lightning strikes.

However, there is a risk of a flashover or sparkover from the lightning receptor or lightning conductor to areas in the blade, where water has accumulated, since water is electrically conductive. In this case, lightning current heats up the water, which may cause a "steam explosion". This may result in pressure increases, which are sufficiently high to damage the blade. Flashovers may also occur because of deposits of, for example, particles from the air, salts or insects on the surface of the blades. The damages due to flashovers result in the blade having to be repaired or, in the worst case, exchanged, which is a time-consuming and expensive process, since it is complicated to repair or exchange blades, especially for offshore wind power plants.

Furthermore, there is a risk of striking the lightning conductor (or flashovers) through the surface of the blade, which at best creates only a small hole through the surface of the blade, but often causes greater damage to the blade. For a better control of the lightning current through the blade without damage thereof, the lightning protection system may be provided with several lightning receptors (multireceptors) or lightning conductors along the longitudinal direction of the blade. Preferably, the lightning receptors are arranged at a maximum interval of five meters to ensure that there are no lightning strikes (or flashovers) through the surface of the blade. However, this is a comparatively expensive and complicated solution.

DISCLOSURE OF INVENTION

The object of the invention is to provide a new and improved lightning protection system for wind turbines.

According to the invention, this object is achieved by the lightning conductor in its entire longitudinal direction as well as the connection area between the lightning conductor and the lightning receptor being electrically insulated in order to prevent the built-up of streamers and/or leaders. Such streamers and leaders are prestages of lightning strikes and thus, preventing their built-up also prevents lightning strikes. This yields an improved efficiency compared to existing lightning protection systems, which most often employ non-insulated lightning conductors. Moreover, the necessity of multireceptors is avoided.

At its root end, the lightning conductor is preferably connected to earth via the hub so that current from a lightning strike is safely conducted from the lightning receptor to the lightning conductor and finally to earth. However, it may be sufficient with a spark gap between the lightning conductor and the hub.

According to a particular embodiment of the invention, the lightning conductor and/or lightning receptor are electrically insulated at least up to the shell body of the blade and preferably at least partially through the shell body. Thus, the risk for damaging lightning strikes or flashovers at the tip end of the blade is minimized.

According to a preferred embodiment of the lightning protection system according to the invention, the lightning conductor comprises an inner conductor made of electrically conductive material, such as copper or aluminum, and a bedding insulation made of polyethylene, preferably HDPE. Surprisingly, this composition has been found to be particularly resistant to lightning strikes or flashovers through the surface of the blade.

Preferably, the inner conductor has a diameter in the range of 3-30 mm, 5-15 mm or 7.5-12 mm and the bedding insulation has a thickness of 2-15 mm, 3-10 mm or 4-7 mm. It has been found that these dimensions are sufficient to prevent lightning strikes through the surface of the blade as well as to conduct the current of a lightning strike through the lightning conductor.

According to a suitable embodiment, a layer of semiconducting material is provided between the inner conductor and the bedding insulation. Preferably, this semiconducting material has a thickness of 0.5-1 mm. The semiconducting material provides additional protection against flashovers by minimizing electrical field concentrations in the conductor.

According to a particular embodiment, the lightning receptor and the connection area between the lightning receptor and the lightning conductor are insulated by means of an insulating material, which is separate from the bedding material. This insulating material may e.g. be a shrink sleeve or silicone. The additional insulating material minimizes the risk of a lightning strike or flashover in the connection area between the lightning receptor and the lightning conductor.

According to an alternative embodiment of the invention, the tip of the blade is formed as a substantially solid body of insulating material. Preferably, this insulating material is a plastic material, such as PVC, fibre-reinforced polymer or polyurethane (PUR), e.g. foam PUR. This provides a particularly simple embodiment, where the risk of lightning strikes in the connection area between the lightning receptor and the lightning conductor is minimized.

According to a suitable embodiment of the invention, the lightning conductor is provided with a connection means, e.g. a thread, at its outer end to connect said conductor to a corresponding means on the lightning receptor. The lightning receptor may e.g. be adapted to include an inner thread so that the lightning receptor and the lightning conductor can be screwed together. According to another suitable embodiment, the lightning receptor is provided with a connection piece having an outer thread, while the lightning conductor includes an inner thread, e.g. cut into the insulating sheathing made of HDPE.

According to an embodiment of the invention, the lightning receptor is positioned at the trailing edge of the blade. Thus, noise emissions from the blade may be reduced. It may be advantageous to provide the surface of the blade with a diverter so that lightning striking at the leading edge of the blade is conducted to the lightning receptor.

According to a particularly suitable embodiment, additionally at least one drain hole is arranged at or in the immediate vicinity of the tip of the blade, and optionally, a diverter extending substantially between the location of the drain hole and the location of the lightning receptor is positioned on the surface of the blade. The drain hole ensures that accumulations of water do not form within the blade, which increases the risk of flashovers from the lightning conductor to said accumulations of water. The diverter ensures that lightning striking a drain hole is conducted to the lightning receptor via the diverter and finally to earth via the lightning conductor. Additionally, a filter for the collection of particles is preferably arranged inside the blade so that said particles do not block the drain hole.

According to a preferred embodiment, the lightning receptor has the form of a Franklin rod or is substantially shaped like an egg. This form ensures that the lightning receptor has no "sharp" edges to be struck by lightning and to be damaged e.g. by melting. A rounded receptor surface prolongs the useful life of the receptor, since its geometry is altered only minimally by a lightning strike.

According to an alternative embodiment of the invention, a part of the tip of the blade is adapted to be the lightning receptor made of e.g. tungsten, copper or brass. This provides a particularly simple embodiment of the tip of the blade. Preferably, the lightning receptor is streamlined so that it matches the tip of the blade.

BRIEF DESCRIPTION OF THE DRAWINGS

The invention is explained in greater detail below by way of embodiments which are shown in the drawings, in which.

BEST MODES FOR CARRYING OUT THE INVENTION

Figures 1A, 1B, 1C:
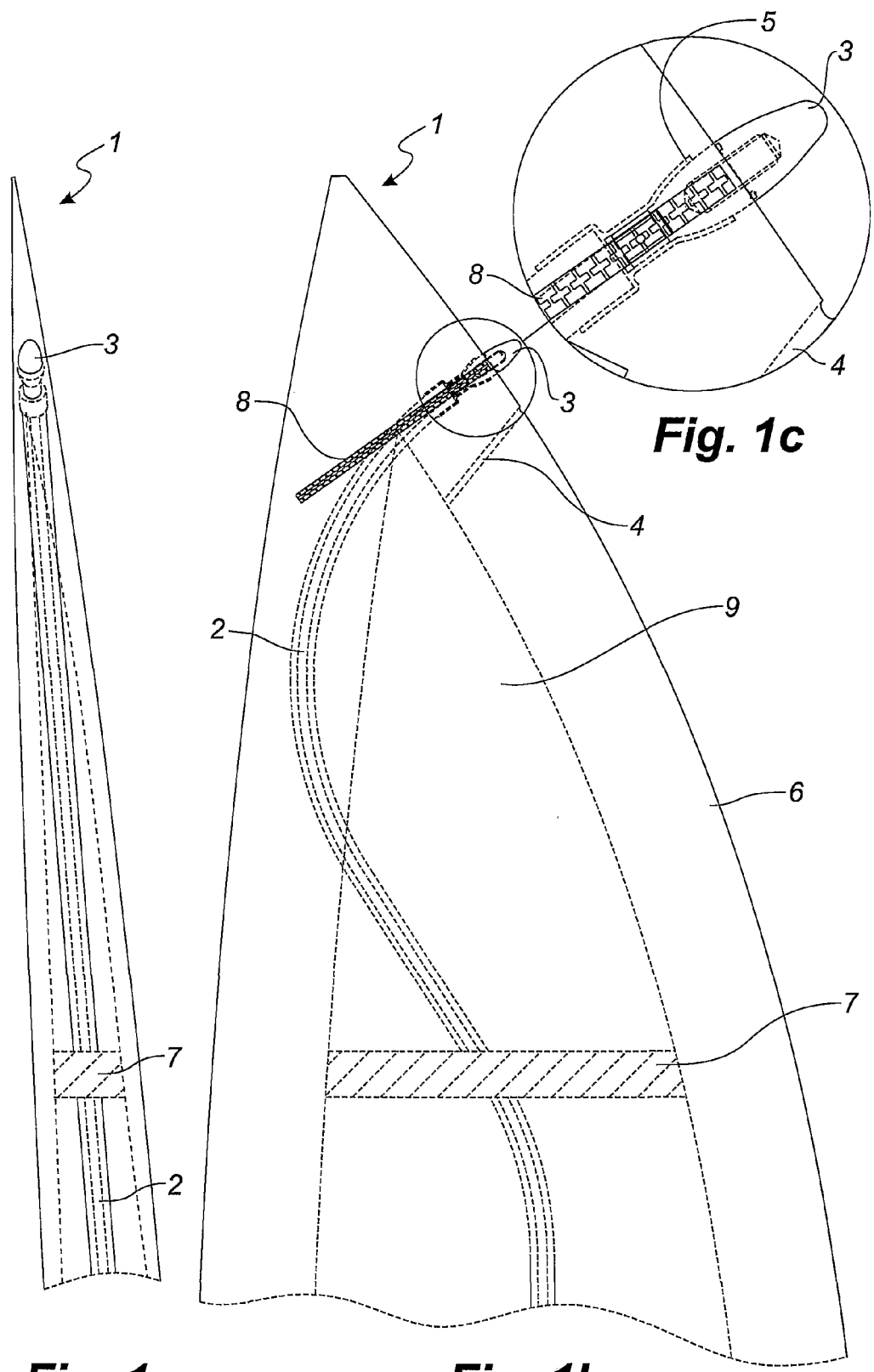
FIG. 1a is a schematic view of a blade according to a first embodiment of the invention, seen towards the trailing edge of the blade.
FIG. 1b is a top view of the same blade.
FIG. 1c shows a magnified detail of the blade shown in FIG. 1b.

Preferably, the invention relates to wind turbines of the type known in the industry as wind turbines according to the Danish concept. Typically, such a wind turbine consists of a tower, a nacelle with gear and generator and a rotor consisting of a hub and three blades, where the rotor shaft is substantially horizontal.

Existing lightning protection systems for blades on a wind turbine according to the Danish concept often use a construction where a so-called lightning receptor made of electrically conductive material is provided at the tip of the blade. This lightning receptor can "capture" a lightning strike and conduct the current through a lightning conductor, said conductor extending in the longitudinal direction of the blade and being earthed via the hub. Typically, the receptor is connected with one side of an anchoring block, while the lightning conductor is connected with the other side of the same anchoring block. It has been found that this construction provides effective protection against lightning strikes, however, it has also been found that it is vulnerable to lightning strikes through the surface of the blade—especially in situations where lightning strikes occur while the blade is in an approximately horizontal position during the rotation of the rotor. Moreover, the anchoring block is often rectangular and has sharp edges, which increases the probability of streamer built-up at said sharp edges and thus the probability of a lightning strike or flashover.

For a better control of the lightning current through the blade without damage thereof, the lightning protection system of the blade may be provided with several lightning receptors or lightning conductors along the longitudinal direction of the blade. Preferably, the lightning receptors are arranged at a maximum interval of five meters to ensure that there are no lightning strikes through the surface of the blade. However, this is a comparatively expensive and complicated solution.

FIG. 1 shows a first embodiment of a blade 1 according to the invention. According to this embodiment, a lightning receptor 3 is positioned at the tip end of the blade 1, said lightning receptor preferably, but not necessarily, being predominantly egg-shaped or formed like a so-called Franklin rod. The lightning receptor 3 is connected to a lightning conductor 2 extending substantially in the entire longitudinal direction of the blade 1 from the lightning receptor 3 at the tip of the blade 1 to the root area of the blade 1 at the rotor hub. Preferably, the lightning conductor portion is electrically connected to the hub, and lightning current from lightning striking the lightning receptor 3 can thus be led to earth via the lightning conductor 2 and the hub, said hub being earthed via a second lightning conductor (not shown) connected to an earth rod by means of e.g. the tower and the nacelle. Furthermore, one or more spark gaps may be provided between the lightning conductor 2 and the hub or between the lightning conductor 2 and the tower. The lightning conductors and the earth rod may be copper conductors or may be made of any other electrically conductive material.

The lightning conductor 2 is insulated substantially in its entire longitudinal direction from the root area of the blade 1 to the connection area between the lightning conductor 2 and the lightning receptor 3. The blade 1 is made up of a shell body preferably made of fibre-reinforced polymer so that the blade 1 comprises a laminate shell 6 and a cavity 9 inside the blade 1, respectively. The lightning conductor 2 and the lightning receptor 3 are connected e.g. by means of a screw thread, where the lightning receptor 3 is preferably provided with an inner thread. However, it is also conceivable to provide an embodiment, where the receptor 3 is provided with a connection piece having an outer thread, said connection piece being screwed together with an inner thread of the lightning conductor 2.

The lightning receptor 3 is positioned in the laminate shell 6 of the blade 1 in such a way that a portion of the receptor 3 projects from the surface of the blade 1 at its trailing edge, where the lightning conductor 2 is passed through a portion of the laminate shell 6. The lightning conductor 2 shown herein includes a first insulation in the form of a bedding or covering insulation. Additionally, the connection area between the receptor 3 and the lightning conductor 2 is electrically insulated by means of a further insulation 5 in the form of a shrink sleeve. The shrink sleeve 5 extends a short distance into the bedding insulation of the lightning conductor 2 and a short distance into the receptor 3. Thus, the lightning conductor 2 is completely insulated up to the receptor 3.

Furthermore, the blade 1 is provided with a drain hole 4 which also passes through the laminate 6 and which is positioned at the trailing edge of the blade 1. The drain hole 4 is connected to the cavity 9, the latter thus communicating with the environment. In this way, the accumulation of water inside the blade 1 is avoided at all times, since water is emptied from the blade 1 via the drain hole 4 by centrifugal forces during the rotation of the rotor. Simultaneously, the blade 1 may be provided with a filter 7 to collect dust and other dirt, which may be present inside the blade 1 so that these are not thrown towards the drain hole 4 and block it. Preferably, the filter 7 is positioned across the entire cross-section of the cavity 9. By positioning the receptor 3 and the drain hole 4 at the trailing edge of the blade 1, noise arising from the rotation of the rotor is reduced.

Additionally, the surface of the blade 1 is provided with a diverter 8 extending from an area adjacent the receptor 3 at the trailing edge of the blade 1 to an area at the leading edge of the blade 1. This diverter ensures that lightning striking the leading edge of the blade 1, while the blade 1 is in a substantially horizontal position, where the receptor 3 faces downwards, is conducted to the receptor 3 and via the latter to the lightning receptor 2. The diverter 8 may be a continuous strip of electrically conductive material, but may also be segmented, where leaders of ionized air are formed between the individual segments upon a lightning strike, the lightning current thereby being conducted along the diverter 8 in its longitudinal direction.

As shown in FIG. 1c, the receptor 3 may be divided into two so that one portion of the receptor is moulded into the laminate shell 6 of the blade 1, while the second portion is attached to the first portion by means e.g. a threaded connection. Thus, it is easy to exchange the portion of the receptor 3 projecting from the surface of the blade 1, if said portion is worn or damaged after a lightning strike.

Figure 2A:
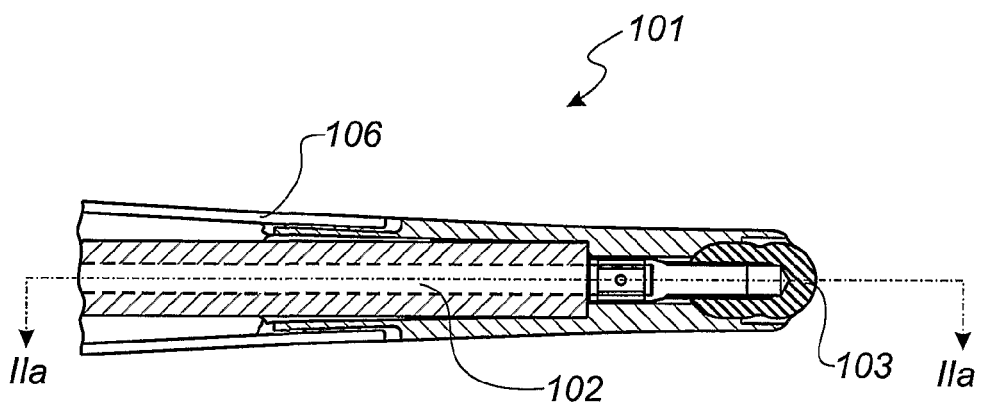
FIG. 2a is a schematic sectional view along the line IIb-IIb in FIG. 2b of a part of a blade according to another embodiment of the invention.
Figure 2B:
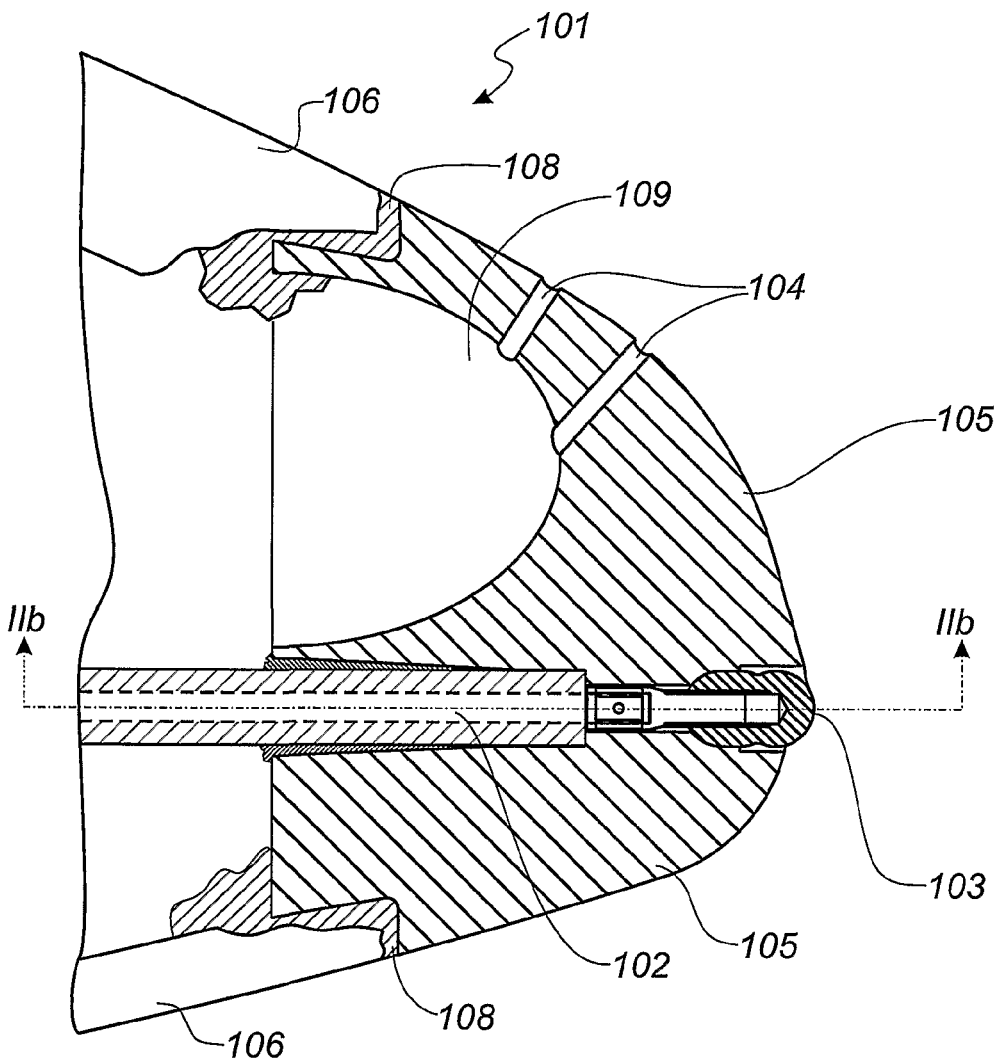
FIG. 2b is a partially sectional view of the same blade along the line IIa-IIa in FIG. 2a, FIG. 3 is a schematic partially sectional top view of a part of a blade according to a third embodiment of the invention.

FIG. 2 shows a second embodiment of a blade 101 according to the invention. The blade 101 according to this embodiment has a tip 105 formed as a solid body of e.g. polyurethane, PVC or fibre-reinforced polymer. The rest of the blade 101 is made of a shell body having a laminate shell 106. As in the embodiment shown in FIG. 1, the lightning protection system of the blade includes a lightning conductor 102 extending substantially in the entire longitudinal direction of the blade 101 from the root end at the rotor hub and to the tip end. The lightning conductor 102 is guided out of the cavity of the blade 101 and into a hole created in the tip 105 and matching the lightning conductor 102. The lightning conductor may be glued to this hole. The lightning conductor is connected with a substantially egg-shaped lightning receptor 103. The lightning receptor 103 is positioned at the surface of the tip 105 so that a small portion thereof projects from the surface. The position and the form of the receptor 103 are adapted to match the desired aerodynamic properties of the tip 105 of the blade 101, while simultaneously having a large metal surface, which ensures good durability and long life, since it contains a large amount of material, which may melt upon a lightning strike.

As in the embodiment shown in FIG. 1, the lightning conductor 102 and the receptor 103 are preferably connected by means of a threaded connection, where the connection area between the lightning conductor 102 and the receptor 103 may be electrically insulated by means of an additional insulation in the form of e.g. a shrink sleeve or silicone. However, the solid tip 105 may be sufficient to provide the desired electrical insulation.

The tip 105 is provided with a cavity 109 being connected to two drain holes 104 so that the cavity can communicate with the environment via the holes. When the rotor rotates, water having possibly accumulated inside the blade 101 is thus guided to the cavity 109 of the tip 105 and from there out through the drain holes 104 due to centrifugal forces. Preferably, the tip 105 is additionally provided with a diverter extending between an area adjacent the drain holes 104 and an area adjacent the receptor 103 on the surface of the tip 105. Any lightning striking the drain holes 104 is thus conducted via the diverter to the receptor 103 and via the latter to the lightning conductor 102 and finally to earth via the hub, the tower or the like. The tip 105 is fastened to the rest of the blade 101 by means of a glue joint 108.

Figure 3:
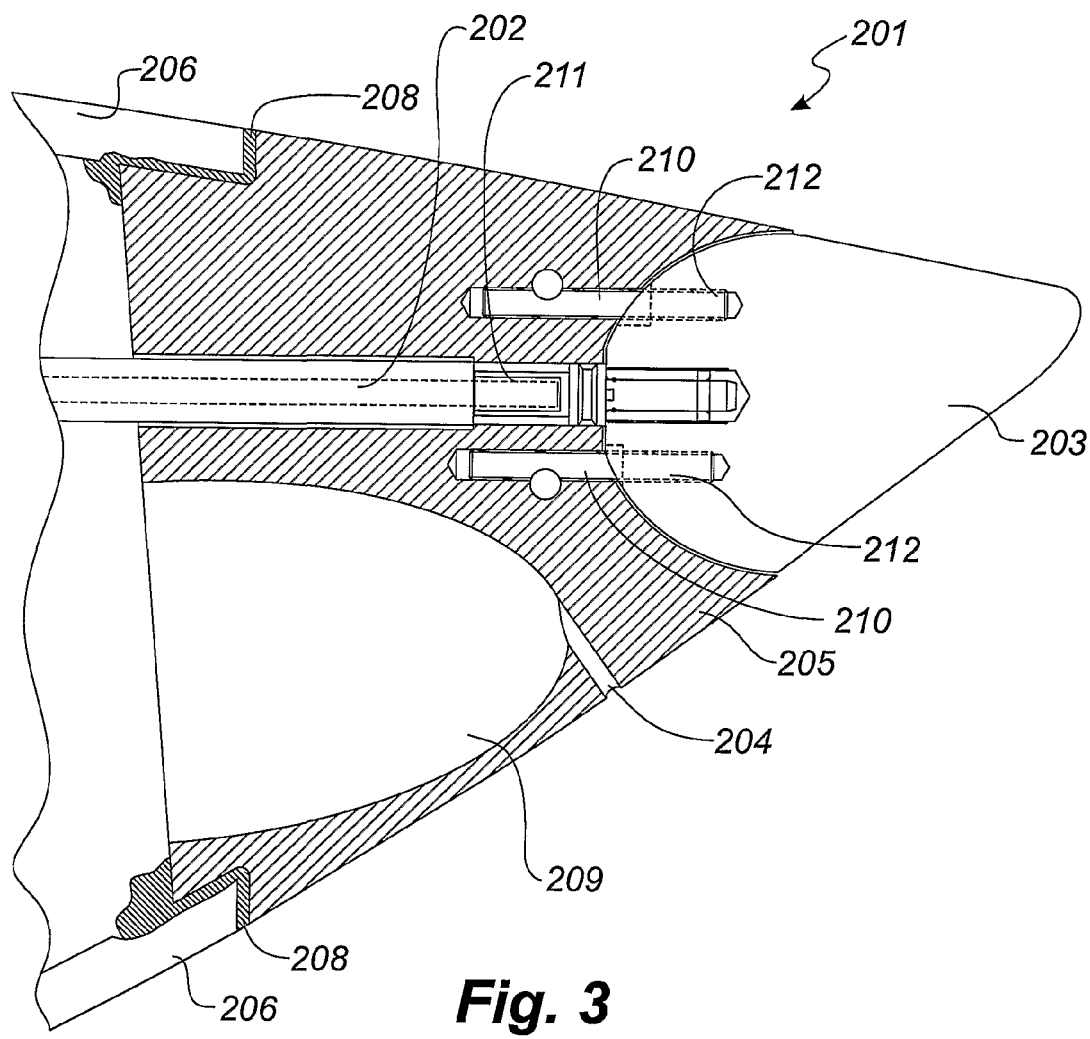

FIG. 3 shows a third embodiment of a blade 201 according to the invention. The blade 201 according to this embodiment has a tip 205 formed as a substantially solid body of e.g. polyurethane, PVC or fibre-reinforced polymer as in the embodiment shown in FIG. 2. The rest of the blade 201 is made of a shell body having a laminate shell 206. As in the embodiments shown in FIG. 1 and FIG. 2, the lightning protection system of the blade 201 includes a lightning conductor 202 extending substantially in the entire longitudinal direction of the blade 201 from the root end at the rotor hub and to the tip end. The lightning conductor 202 is guided out of the cavity of the blade 201 and into a hole created in the tip 205 and fitting the shape of the lightning conductor 202.

The lightning conductor 202 is connected to a lightning receptor 203 having a rounded shape and positioned at the apex of the tip 205. The lightning receptor 203 is adapted so that there is a substantially smooth transition between the tip 205 and the receptor 203 and so that it has the desired aerodynamic properties of the tip 201. In other words, the receptor 203 according to this embodiment is a part of the tip of the blade 201.

As in the embodiments shown in FIG. 1 and FIG. 2, the lightning conductor 202 and the receptor 203 are connected by means of a clamped connection or a threaded connection 211. Moreover, the lightning conductor is anchored to the tip 205 by means of two plastic rods 210 with outer thread and two threaded holes in the receptor 203. The connection area between the lightning conductor 202 and the receptor 203 is electrically insulated by means of a further insulation in the form of e.g. a shrink material or silicone. However, the solid tip 205 may be sufficient to provide the desired electrical insulation.

Since lightning "tries" to find the shortest way to earth, lightning often strikes the blade of the rotor which at the time of striking projects the highest in the air. However, there is a risk of lightning striking a blade while being in a substantially horizontal position during the rotation of the rotor. This is the situation with the highest probability of a lightning strike through the laminate of the blade or at the joints between the blade shell halves.

The present applicant has conducted a number of tests to examine lightning protection systems for blades in such worst-case scenarios. The so-called high voltage switching and lightning impulse simulations were conducted by suspending a blade in a horizontal position above a laboratory floor or surface which during the test simulates an equipotential surface, which prior to a lightning strike occurs above the blade, while being near the horizontal position. A potential difference was built up between the laboratory surface and the lightning protection system of the blade to provoke a flashover between the lightning protection system of the blade and the laboratory floor. The tests were carried out with both positive and negative polarity, where flashovers with positive polarity were carried out at 1050 kV, while flashovers with negative polarity were carried out at 1400 kV.

The tests were carried out with various LM28.8P blades from LM Glasfiber with different lightning protection systems. It was demonstrated very quickly that traditional lightning protection systems, where the receptor and the lightning conductor are connected to an anchoring block, insufficiently prevent lightning strikes through the laminate of the blade or the joints of the blade shell halves.

When testing different lightning conductors for a lightning protection system corresponding to the lightning protection system shown in FIG. 2, it was surprisingly found that a lightning conductor in the form of a cable having a copper core and an insulation made of high density polyethylene (HDPE) was particularly effective in preventing lightning striking through the surface of the blade. After 22 simulated lightning strikes, 12 positive ones and 10 negative ones, the blade showed no visible damage or other negative effects. During all simulated lightning strikes only streamer formation at the receptor of the blade was observed.

Figure 4:
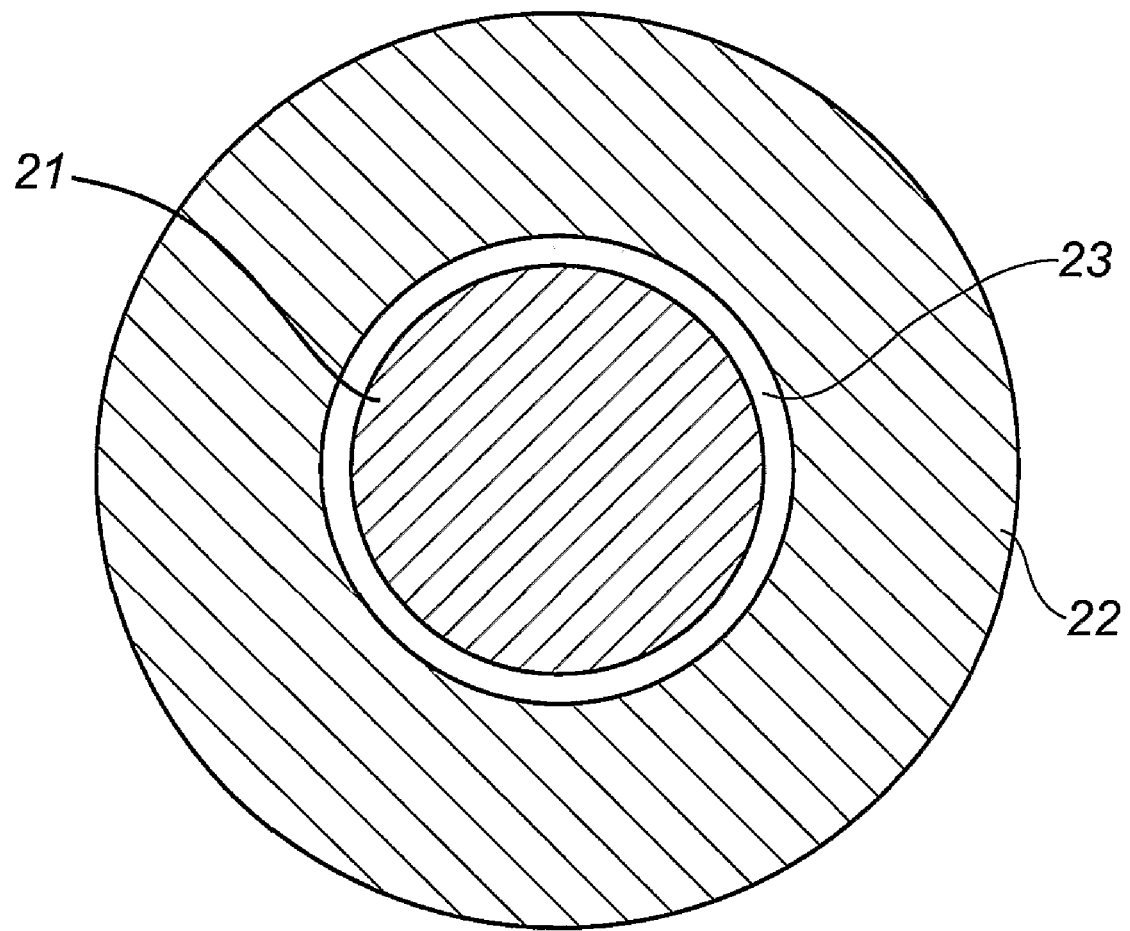
FIG. 4 is a sectional view through a lightning conductor according to the invention.

As shown in FIG. 4, the examined cable is constructed of a 50 mm$^2$ core 21 made of copper wires and an approx. 4.5 mm thick insulation sheathing 22 made of HDPE. Between the core 21 and the insulation 22, there is provided a semiconducting material 23 having the object to minimize electrical field concentrations at the individual copper wires. However, the semiconducting material is not absolutely necessary to achieve the desired effect for the lightning protection system. It was found to be sufficient to use a comparatively thin HDPE insulation. This is advantageous, since the cable does not result in an unnecessarily large increase in the blade weight. Moreover, such a cable is very inexpensive. Thus, the novel lightning protection system does not only effectively prevent lightning strikes through the surface of the blade, but also provides a simpler construction and is less expensive to manufacture than traditional lightning protection systems with or without multireceptors.

The invention has been described with reference to preferred embodiments. Many modifications are conceivable without thereby deviating from the scope of the invention. Modifications and variations apparent to those skilled in the art are considered to fall within the scope of the present invention.

REFERENCE NUMERAL LIST 1, 101, 201 blade
2, 102, 202 lightning conductor
3, 103, 203 lightning receptor
4, 104, 204 drain hole
5 shrink sleeve or shrink material
105, 205 tip
6, 106, 206 laminate shell
7 filter
8 diverter
108, 208 glue joint
9, 109, 209 cavity
21 inner conductor
22 insulation bedding or covering
23 semiconducting material
210 plastic rod
211 threaded connection
212 threaded hole

The invention claimed is:

1. A wind turbine blade with a lightning protection system (1, 101, 201), wherein the blade (1, 101, 201) is a shell body made of a composite material and comprises a root area and a tip end, and wherein the lightning protection system comprises:

at least one lightning receptor (3, 103, 203) arranged freely accessible in or on the shell unit surface at or in the immediate vicinity of the tip of the blade (1, 101, 201), and a lightning conductor (2, 102, 202) made of electrically conductive material extending within the shell body along substantially the entire longitudinal direction of the blade (1, 101, 201), and wherein the lightning receptor (3, 103, 203) and the lightning conductor (2, 102, 202) are electrically connected by means of a connection area, characterized in that the lightning conductor (2, 102, 202) in its entire longitudinal direction as well as the connection area between the lightning conductor (2, 102, 202) and the lightning receptor (3, 103, 203) is electrically insulated in order to prevent the built-up of streamers and/or leaders.

2. A wind turbine blade according to claim 1, characterized in that the lightning conductor (2, 102, 202) and/or lightning receptor (3, 103, 203) are electrically insulated at least up to the shell body of the blade (1, 101, 201) and preferably at least partially through the shell body.

3. A wind turbine blade according to claim 1, characterized in that the lightning conductor (2, 102, 202) comprises an inner conductor (21) made of electrically conductive material, such as copper or aluminium, and a bedding insulation (22) made of polyethylene, preferably HDPE.

4. A wind turbine blade according to claim 3, characterized in that the inner conductor (21) has a diameter in the range of 3-30 mm, 5-15 mm or 7.5-12 mm and the bedding insulation (22) has a thickness of 2-15 mm, 3-10 mm or 4-7 mm.

5. A wind turbine blade according to claim 3, characterized in that a layer of semiconducting material (23) is provided between the inner conductor (21) and the bedding insulation (22).

6. A wind turbine blade according to claim 3, characterized in that the lightning receptor (3,103, 203) and the connection area between the lightning receptor (3, 103, 203) and the lightning conductor (2, 102, 202) are insulated by means of an insulating material, which is separate from the bedding material.

7. A wind turbine blade according to claim 3, characterized in that the tip (105, 205) of the blade (1, 101, 201) is formed as a substantially solid body of insulating material.

8. A wind turbine blade according to claim 7, characterized in that the insulating material is a plastic material, such as PVC, fibre-reinforced polymer or polyurethane (PUR), e.g. foam PUR.

9. A wind turbine blade according to claim 1, characterized in that the lightning conductor (2,102, 202) is provided with a connection means, e.g. a thread, at its outer end to connect said conductor to a corresponding means on the lightning receptor.

10. A wind turbine blade according to claim 1, characterized in that additionally, at least one drain hole (4, 104, 204) is arranged at or in the immediate vicinity of the tip of the blade (1, 101, 201), and optionally, that a diverter extending substantially between the location of the drain hole (4, 104, 204) and the location of the lightning receptor (3, 103, 203) is positioned on the surface of the blade (1, 101, 201).

11. A wind turbine blade according to claim 1, characterized in that the lightning receptor (3, 103, 203) has the form of a Franklin rod or is substantially shaped like an egg.

12. A wind turbine blade according to claim 1, characterized in that a part of the tip (205) of the blade (201) is adapted to be the lightning receptor (203) made of e.g. tungsten, copper or brass.

* * * * *